United States Patent [19]

Vignotto

[11] Patent Number: 5,090,236
[45] Date of Patent: Feb. 25, 1992

[54] PHONIC ELEMENT FOR SPEED SENSING BEARING ASSEMBLY

[75] Inventor: Angelo Vignotto, Turin, Italy

[73] Assignee: Riv-SKF Officine di Villar Persosa S.p.A., Turin, Italy

[21] Appl. No.: 588,348

[22] Filed: Sep. 26, 1990

[30] Foreign Application Priority Data

Sep. 28, 1989 [IT] Italy .................. 67807 A/89

[51] Int. Cl.$^5$ .......................................... G01M 15/00
[52] U.S. Cl. .................................. 73/118.1; 384/448
[58] Field of Search ................. 73/118.1, 493, 494, 73/518–520; 324/173, 174, 207.25; 310/168; 384/448, 477, 119

[56] References Cited

U.S. PATENT DOCUMENTS

| | | | |
|---|---|---|---|
| 4,288,746 | 9/1981 | Singbartl | 324/174 |
| 4,667,156 | 5/1987 | Machino et al. | 73/494 |
| 4,778,286 | 10/1988 | Kadokawa | 384/448 |
| 4,795,278 | 1/1989 | Hayashi | 384/448 |
| 4,969,753 | 11/1990 | Kato et al. | 384/448 |

FOREIGN PATENT DOCUMENTS 637311 5/1950 United Kingdom ........... 324/174

*Primary Examiner*—Robert Raevis
*Attorney, Agent, or Firm*—Eugene E. Renz, Jr.

[57] ABSTRACT

Phonic wheel for determining the speed of a rotating element, characterized in that at least the surface by which the wheel is mounted on the rotating ring on the wheel hub bearing and the operating portion facing the sensor that detects the mechanical signals produced by the wheel are enclosed by and coated with an elastomeric or rubber material.

3 Claims, 1 Drawing Sheet

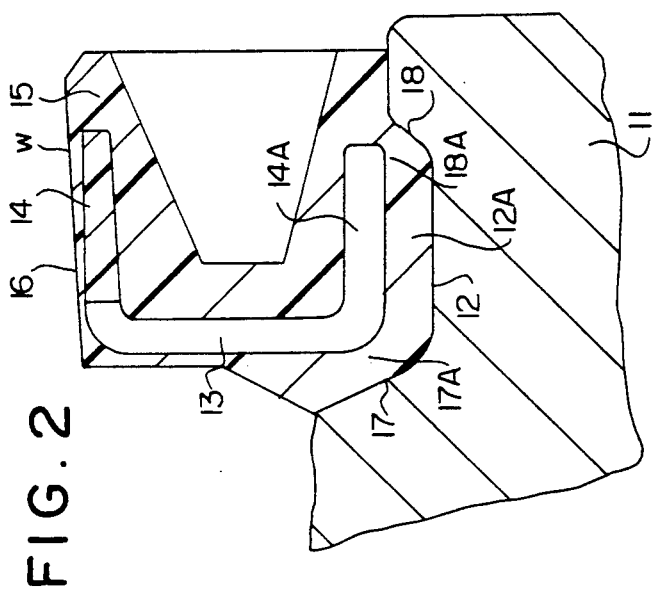
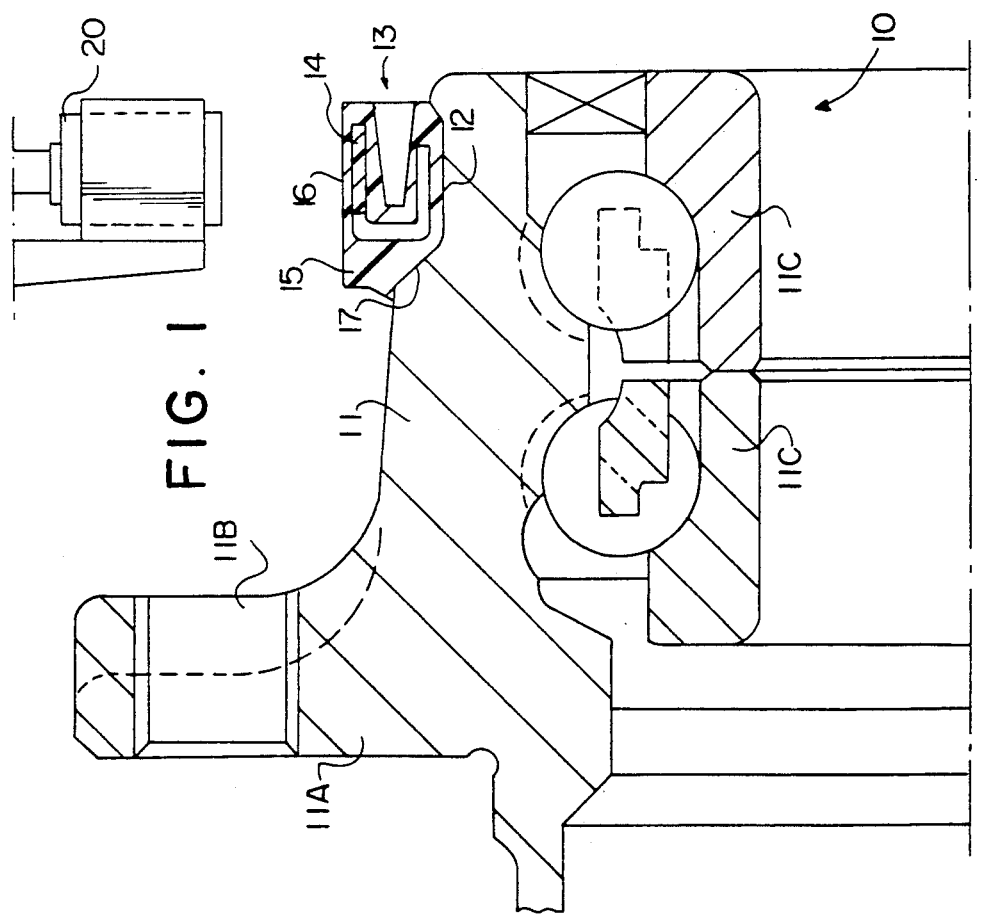

PHONIC ELEMENT FOR SPEED SENSING BEARING ASSEMBLY

FIELD OF THE INVENTION

The present invention relates to improvements in speed sensing assemblies and particularly to improvements in a so-called phonic wheel used for determining the speed of a rotating element such as the wheel hub bearings of vehicles.

More specifically the present invention provides improvements in the phonic wheel element wherein at least the surface by which the wheel is mounted on the rotating ring of the wheel hub bearing and the operating portion facing the sensor which detects the mechanical signals produced by the wheel are coated with elastomeric or rubber material by immersion.

BACKGROUND OF THE INVENTION

Systems capable of preventing brakes from locking have been in use on vehicles for a number of years. These anti-skid braking systems are commonly referred to as ABS braking system. These systems require a sensor for detecting the speed of rotation of the wheel hub. The sensor element functions to convert mechanical rotation to an electrical signal which is then transmitted to an actuating device. The sensor detects the mechanical signal produced by a wheel known as a "phonic" wheel.

In a typical ABS system, the phonic wheel is usually keyed directly on the outer rotating ring of the wheel hub bearing assembly. This arrangement has certain disadvantages and drawbacks. For example, the phonic wheel is usually an element made of metal which is keyed directly on the outer ring of the wheel hub bearing which is also a metal, such as steel. By reason of the metal to metal contact between the phonic wheel and the outer ring of the bearing, there is a great risk of deformation of the outer ring of the bearing which can damage the entire wheel hub assembly.

Another problem in the prior hub assemblies described above is that in the case of jolts, the phonic wheel may ride on the outer ring and be displaced axially, since there are no interposed elastic elements. This can impair the functioning of the device for detecting the speed of the wheel.

It has also been observed that temperature changes can cause deformations in the system, especially in the phonic wheel which leads to the loss of interference between the sensor and the wheel itself.

It is also the case that the phonic wheel and/or sensor are susceptible to damage in the case of collision between these elements, because their confronting surfaces are metal and are closely adjacent to one another.

Lastly, it has been found that the phonic wheel is subject to corrosion over a period of time by external corroding agents in the environment of the phonic wheel which renders the entire system useless.

SUMMARY OF THE INVENTION

With the foregoing in mind, it is the object of the present invention to provide an improved wheel sensing system which overcomes the difficulties and the disadvantages of the systems described above. This is accomplished by coating the phonic wheel entirely or partially with a protective layer of elastic material. In accordance with the present invention at least the surface by which the wheel is mounted on the rotating ring of the wheel hub bearing and the operating portion facing the sensor which detects the mechanical signals produced by the wheel are coated by immersion with an elastomeric or rubber material.

BRIEF DESCRIPTION OF THE DRAWINGS

These and other objects of the present invention and the various features and details of the operation and construction thereof are hereinafter more fully set forth with reference to the accompanying drawings, where:

FIG. 1 is an axial sectional view of a wheel hub bearing embodying a phonic wheel according to the present invention; and FIG. 2 shows an enlarged view of the portion of the ring of the bearing in which the phonic wheel according to the invention is mounted.

DETAILED DESCRIPTION OF THE PREFERRED EMBODIMENT

Referring now to the drawing and particularly to FIG. 1 thereof, there is illustrated a wheel hub bearing assembly generally designated by the numeral 10 which, as is conventional, comprises an outer rotating ring 11 having an outwardly directed flange 11A with bolt holes 11B for securing the outer ring to a wheel and a pair of inner rings 11C spaced from the outer ring defining a space for two rows of balls.

The outer peripheral surface of the outer rotating ring 11 has a circumferentially extending recess 12 defining a seat for a phonic wheel 13. The phonic wheel 13 is of generally C-shaped cross section or profile having an upper fin 14 incorporating the toothing or magnetic surface detectable by a sensor 20 spaced radially opposite and closely adjacent fin 14.

In accordance with present invention, the phonic wheel 13 is encapsulated in an outer cover or shell 16 of elastomeric or rubber material which in the illustrated embodiment encapsulates the phonic wheel 13 completely. The cover 16 has a thin walled section W in the area of the fin 14 which faces the sensor 20. The rubber or the elastic material comprising cover 16 in this region is extremely thin, with a maximum thickness of 0.5 mm, to avoid altering signals transmitted by the phonic wheel 13 to the sensor 20 via the transmitting fin 14. The cover 16 in the region of the inner fin 14A has two outwardly beveled circumferentially extending sides 17A and 18A on either side of the base 12A which confront and engage the recess 12 in the outer ring which complement the angle of lateral flanks 17 and 18 extending from opposing side which form the sides walls of recess 12. This provides a positive anchoring of the phonic wheel 13 and prevents slippage of the phonic wheel 13 during operation which has the disadvantages and drawbacks noted above. Furthermore, the complementary seating arrangement provided the support shoulders always insures correct positioning of the phonic wheel 13 in both directions against the lateral flanks 17,18. Furthermore, since the anchoring is effected through the elastic covering 16 phonic wheel 13 is no longer keyed directly on the rotating outer ring 11 and so the risk of deformation is eliminated, which as noted above can result in damaging the entire bearing assembly.

Other advantages of the particular configuration of the phonic wheel 13 in accordance with the present invention include the fact that encapsulation of the phonic wheel 13 provides complete protection against corrosion of the phonic wheel 13. It also provides a measure of protection and eliminates the danger of damage to the ring 11 by external shocks and particularly by accidental jolts against the sensor 20 since the elastomeric or rubber cover 16 effectively absorbs and dampens the shocks.

While particular embodiments of the present invention have been illustrated and described herein, it is not intended to limit the invention and changes and modifications may be made therein within the scope of the following claims.

What is claimed is:

1. A speed sensing bearing assembly, comprising:
   a wheel hub having a rotating ring member and a non-rotating ring member with rolling elements therebetween;
   a impulse ring mounted on one axial end of said rotating ring member;
   a sensor in operating relationship to said impulse ring;
   means defining a groove in said rotating ring member for axially positioning said impulse ring with respect to said sensor, said groove having a flat base and divergent side flanks;
   said impulse ring being enclosed in an outer cover consisting of elastomeric or rubber material and having a flat base and outwardly beveled circumferentially extending sides, said base and sides being conformed to said recess and flanks to readily facilitate precise permanent positioning of said impulse ring when said wheel is mounted on said ring.

2. A speed sensing bearing assembly, comprising:
   a wheel hub having a rotating ring member and a non-rotating ring member with rolling elements therebetween;
   a impulse ring mounted on one axial end of said rotating ring member and having a annular element facing radially outward;
   a sensor in operating relationship to said annular element;
   means defining a groove in said rotating ring member for axially positioning said annular element with respect to said sensor, said groove having a flat base and divergent side flanks;
   elastomeric coating material encapsulating said impulse ring and having a flat base and outwardly beveled circumferentially extending sides conforming to said recess and flanks, whereby the impulse ring may be snap fitted in place in the groove in said rotating ring member and thereby precisely and permanently position said annular element in said ring member in a predetermined precise position relative to said censor.

3. A speed sensing bearing assembly as claimed in claim 1, wherein said phonic wheel is of generally C-shaped cross section including an upper fin and wherein the outer cover in the region of the upper fin is extremely thin in the order of a maximum not to exceed 0.5 mm.

* * * * *